UNITED STATES PATENT OFFICE.

G. W. FERRIS, OF QUINCY, ILLINOIS.

IMPROVEMENT IN PREPARING CHARCOAL FOR FILTERING.

Specification forming part of Letters Patent No. 56,198, dated July 10, 1866.

*To all whom it may concern:*

Be it known that I, G. W. FERRIS, of Quincy, in the county of Adams and State of Illinois, have invented a new and useful Improvement in Preparing Charcoal; and I do hereby declare that the following is a full, clear, and exact description thereof, which will enable others skilled in the art to understand the same.

The object of this invention is to remove from charcoals all foreign matter and prepare the same in such a manner that they are particularly fit for clarifying spirituous liquors, and also for filtering purposes in general.

The charcoals which I use, by preference, are made from sugar-maple; but they may also be made of any other wood, which I prepare as follows: I cut and split the wood in pieces one inch by one and a half inch square, and form heaps on the ground on a place which must be thoroughly clean. The heaps are formed in the usual manner, the wood being loosely covered with earth or sand, and they are set on fire, so as to char the wood. When the mass has been burned into coal I rake said coal out from the bed and sprinkle on the same, while still in an incandescent state, a quantity of the best corn-meal, taking about one and one-half pound of meal to the bushel of coal, and stirring the mass together for a short time. By the action of the corn-meal all the foreign matter contained in the coal is extracted and caused to pass off in the form of vapor, and the coal is left perfectly pure and eminently fit for filtering purposes, and particularly for clarifying and refining whisky or other spirituous liquors.

Having thus described my invention, I claim as new and desire to secure by Letters Patent—

The within-described process of preparing charcoal by treating the same with corn-meal, substantially as and for the purposes set forth.

The above specification of my invention signed by me.

G. W. FERRIS.

Witnesses:
    WM. F. MCNAMARA,
    W. HAUFF.